3,640,986
POLYMERIZATION OF CYCLIC MONOOLEFINS
John E. Burleigh and Carl A. Uraneck, Bartlesville, Okla., assignors to Phillips Petroleum Company
No Drawing. Filed Apr. 21, 1969, Ser. No. 818,061
Int. Cl. C08f 7/02
U.S. Cl. 260—93.1   10 Claims

ABSTRACT OF THE DISCLOSURE

Amines are employed as promoters in a process for the polymerization of cyclic monoolefins with a catalyst of a metal complex and an organo-metallic compound.

---

This invention relates to the polymerization of cyclic monoolefins. In another aspect, this invention relates to the employment of amines as promoters in the polymerization of cyclic monoolefins.

Previously, it has been known to the art that metal complexes and organometallic compounds are catalysts for the polymerization of cyclic monoolefins.

It has now been discovered that an amine can be employed as a promoter in the polymerization of a cyclic monoolefin with a catalyst of a metal complex and an organometallic compound with improved results, i.e., the rate of polymerization improved. This improvement is achieved without a change in the structure of the polymer, i.e., trans-unsaturation content.

It is an object of this invention to provide a process for the polymerization of cyclic monoolefins.

Another object of this invention is to provide a process employing amine promoters in the polymerization of a cyclic monoolefin.

Other objects, advantages, and features of this invention will be apparent to one skilled in the art from the following disclosure and claims.

The olefins polymerized according to this invention are cyclic monoolefins. These cyclic monoolefins can have 5 and from 7–15 carbon atoms per molecule. Examples of suitable cyclomonoolefins include cyclopentene; cycloheptene; cyclooctene; cyclodecene; cyclododecene; cyclopentadecene; 3 - methylcyclopentene; 3,3 - dimethylcycloheptene; 3 - methyl - 4,5-di-n-propylcyclooctene; 3-cyclohexylheptene and the like. Polymers prepared from cyclopentene are of particular interest as are polymers prepared from cycloheptene and cyclooctene.

The amines employed as polymerization promotors according to this invention are primary, secondary, or tertiary aliphatic or aromatic amines having from 1 to 30 carbon atoms. These amines can also include nitrogen-containing heterocyclic compounds. Examples of these amines include: methylamine, triacontylamine, dodecylamine, tridecylamine, trimethylamine, dimethylamine, di-(pentadecyl)amine, triethylamine, diallylamine, N,N-diallyl - sec - butylamine, dibutylamine, tert - butylamine, N - methyl-N-propyl-hexylamine, cyclopentylamine, N,N-dimethyl-cyclohexylamine, N-decyl-cyclodecylamine, cyloocetylamine, 3 - cyclohexenylamine, 3 - aminomethyl-cyclopentene; pyrrole; pyridine, indolizine, isoindole, indole, isoquinoline, quinoline, carbazole, phenanthridine, acridine, pyrollidine, piperidine, 1-ethylpiperidine, isoindoline, quinuclidine, morpholine, N-methyl-morpholine, aniline; N,N-dimethylaniline, N-ethylaniline, o-toluidine, p-toluidine, N-methyl-1-naphthylamine, 2-naphthylamine, 3-biphenylamine, N,N - diheptyl - 3 - fluoranthenylamine, 1-acenaphthenylamine; N-ethyl-3-phenylbutylamine, and the like.

The metal complex employed in this invention is a metal complex having the formula $MX_nY_{(z-n)}$ wherein M is niobium, molybdenum or tungsten; X is a halogen; Y is the ligand —OCOR, —OR, or —OCO—R'—OCO— wherein R is a hydrocarbon radical having from 3 to 29 carbon atoms and R' is a divalent hydrocarbon radical having from 4 to 20 carbon atoms; $n$ is an integer from 2 to 4; and $z$ is the oxidation state of M. Examples of suitable complexes include niobium dibromide tributoxide; niobium triiodide diphenoxide; niobium tetrachloride butanoate; niobium trichloride disterate; tungsten tetrachloride adipate; tungsten diiodide tetra(octanoate); tungsten tetrabromide di(triacontanoate); tungsten tetrachloride distearate; tungsten tetrafluoride diphenoxide; molybdenum diiodide tri(decanoxide); molybdenum trichloride adipate; molybdenum tribromide di(nonacosanoxide); and the like. Molybdenum complexes are of particular interest. Examples of these molybdenum complexes are: molybdenum trichloride distearate, molybdenum trichloride dilaurate, molybdenum trichloride dibenzoate, and other molybdenum trihalo dicarboxylates.

The organometallic compound employed in this invention is a compound having the formula $R''_aM'X_b$ wherein R'' is a hydrocarbon radical having from 1 to 20 carbon atoms; M' is a Group I, II or III–A metal as given in the Table of Elements, Handbook of Chemistry and Physics, Chemical Rubber Company, 46th edition, p. B–3; X is a halogen; $a$ is an integer from 1 to 3; $b$ is an integer from 0 to 3; and $a$ plus $b$ equals the valence of M'. Examples of suitable organometal compounds include phenylsodium; eicosyllithium; diethylmagnesium; dibutylzine; phenylcalcium iodide; octylzinc chloride; triethylgallium; trimethylindium; diphenyl barium; butylcadmium iodide; decylmagnesium bromide; butyllithium, and the like. Organoaluminum compounds such as alkyl aluminum compounds, alkyl aluminum halide compounds, mixtures thereof, and the like are of particular interest. Examples of these organoaluminum compounds are: triethyl aluminum, triisobutylaluminum, ethylaluminumdichloride, diethylaluminum chloride, and the mixtures of organoaluminum halides such as methylaluminum sesquichloride, ethylaluminum sesquichloride, and the like.

The polymerization reaction conditions can vary over a broad range. Generally, the temperature is in the range from −50 to 150° C., preferably 0 to 75° C., and the pressure is sufficient to maintain the reaction mixture in the liquid phase. The time is dependent upon the temperature as well as upon the catalyst and generally is in the range from 1 to 100 hours.

The process of this invention can be carried out in the presence of a diluent, if desired. Paraffins, cycloparaffins, and aromatic hydrocarbons having from 3 to 12 carbon atoms are suitable. Examples of these diluents are: propane, isobutane; n-pentane, isooctane, n-dodecane, cyclopentane, cyclohexane, methylcyclohexane, benzene, toluene, xylene, and the like, and mixtures thereof.

The amount of amine promoter employed acording to this invention can be expressed in terms of molar ratio of the amine to the metal complex. The molar ratio of the amine to the metal complex generally is from 0.10:1 to 0.75:1, preferably from 0.25:1 to 0.60:1.

The amine promoter of this invention can be charged in various orders, i.e., the promoter can be added prior to all other ingredients or can be added after the metal complex and the olefin. It is preferred to add the amine before the organometallic compound, which is generally added last.

The ratio of catalyst components varies depending upon the compounds employed. The mole ratio of organometallic ompound to the metal complex is generally in the range from 0.1:1 to 10:1, preferably in the range of 0.5:1 to 3:1.

The catalysts herein described have been found useful for the polymerization of cyclic monoolefins to materials which range in nature from thermoplastics to rubbery polymers to liquids.

The polymers formed by polymerizing cyclic monoolefins as herein described have numerous applications. Polymers of cyclic monoolefins can be compounded with various fillers, antioxidants, extenders, pigments, vulcanizing agents, vulcanization accelerators, plasticizers, and the like which are well known in the art. These polymers can be employed in the preparation of tubing, pipe, containers, shoe soles, floor tile, tires, toys and the like.

Rubbery products prepared according to this invention have a good balance of properties. They can be oil extended to give vulcanizates with good properties. The raw polymers have a high degree of hand tack and green strength. Reinforced vulcanizates have a high electrical resistivity. They can be employed alone as tire tread stock or blended with other rubbers or plastics. They can be used to improve the tack of rubbers such as butadiene/styrene emulsion copolymers, cis-polybutadiene, and other solution-polymerized conjugated diene polymers. They can also be employed in adhesive formulations.

The advantages of this invention are further illustrated by the following examples. The reactants, the proportions and other specific conditions are presented as being typical and should not be construed to limit the invention unduly.

EXAMPLE I

Triethylamine was employed as a promoter in a series of runs in which cyclopentene was polymerized employing the recipe shown below:

Polymerization recipe

Toluene, parts by weight _____ 430
Cyclopentene, parts by weight _____ 100
$MoCl_3(stearate)_2$, millimoles _____ 2.56
$Et_2AlCl$, millimoles _____ 4.5
Triethylamine, millimoles _____ variable
Temperature, °C. _____ 5
Time, hours _____ variable In these runs, the toluene was charged first, followed by a nitrogen purge. Each reactor was then flushed with argon and finally pressured to 25 p.s.i.g. with argon. Triethylamine (if added) was charged next followed by cyclopentene. Each mixture was cooled to 0° C. and then molybdenum trichloride distearate was added. Diethylaluminum chloride was added last after which each mixture was agitated for the desired time at 5° C. Each run was terminated by adding a mixture of toluene and a 10 weight percent solution of 2,2'-methylene-bis(4-methyl-6-tert-butylphenol) in isopropyl alcohol with the amount added being sufficient to provide about 1 part of the antioxidant per 100 parts of polymer. Additional toluene and isopropyl alcohol was then added to obtain a more fluid mixture of the terminated polymer. The polymer was recovered from each run by coagulating the diluted terminated polymer solution with isopropyl alcohol. The recovered polymers were dried under vacuum at 60° C.

The results obtained in these runs are shown in Table I.

TABLE I

| Run No.: | Triethylamine, mhm.[1] | Time, hours | Conversion, percent | Inherent viscosity[2] | Unsat. trans, percent |
|---|---|---|---|---|---|
| 1 | 0 | 0.4 | 21 | | |
| 2 | 0 | 0.9 | 35 | | |
| 3 | 0 | 2.7 | 51 | 4.09 | |
| 4 | 0 | 4.1 | 60 | 3.63 | 87 |
| 5 | 0 | 5.7 | 68 | 3.35 | 90 |
| 6 | 0.6 | 0.25 | 20 | | |
| 7 | 0.6 | 0.9 | 39 | 4.53 | |
| 8 | 0.6 | 2.5 | 65 | 3.84 | |
| 9 | 0.6 | 4.1 | 69 | 3.40 | 91 |

[1] Gram millimoles per 100 grams of monomer.
[2] Inherent viscosity was determined according to the procedure described in U.S. Patent 3,278,508, column 20, notes a and b.

All of the polymers were gel-free.

Comparison of the results from these runs show that triethylamine exerts an accelerating effect on the rate of cyclopentene polymerization according to this invention

EXAMPLE II

Another series of runs were conducted in which various amines were employed as promoters in cyclopentene polymerization according to the recipe shown below.

Polymerization recipe

Toluene, parts by weight _____ 430
Cyclopentene, parts by weight _____ 100
$MoCl_3(stearate)_2$, millimoles _____ 2.56
$Et_2AlCl$, millimoles _____ 4.5
Amine promoter _____ variable
Temperature, °C. _____ 5
Time, hours _____ 1.2

The charging order and polymer isolation procedure employed in these runs was the same as that shown in Example I. The results obtained in these runs are shown in Table II.

TABLE II

| | Promoter | | Conv., percent | Inherent viscosity | Unsat. trans, percent |
|---|---|---|---|---|---|
| | Name | Mhm. | | | |
| Run No.: | | | | | |
| 1 | N-methylmorpholine | 1.0 | 34 | 5.46 | 83 |
| 2 | Diallylamine | 1.0 | 50 | 4.46 | 86 |
| 3 | Isoquinoline | 1.0 | 42 | 5.45 | 84 |
| 4 | 2-picoline | 1.0 | 46 | 5.30 | 86 |
| 5 | | 0 | 30 | 4.15 | 84 |
| 6 | 1-Ethylpiperidine | 1.0 | 50 | 5.13 | 88 |
| 7 | N,N-diallyl-sec-butylamine | 1.0 | 46 | 4.66 | 86 |
| 8 | o-Toluidine | 1.0 | 40 | 5.02 | 88 |
| 9 | Di-n-butyl amine | 1.0 | 47 | 4.67 | 89 |
| 10 | Triethylamine | 1.0 | 51 | 4.99 | 94 |
| 11 | | 0 | 28 | 4.07 | 91 |
| 12 | Triphenylphosphine | 1.0 | 28 | 5.60 | 83 |

In each run employing an amine promoter the conversion was higher than that obtained in the control runs (Nos. 5 and 11). Note, the percent conversion in Run 12, which employed a phosphine promoter, was the same as or lower than either of the control runs; and lower than all of the runs employing an amine promoter. Thereby, Run 12 demonstrates the unpredictability of the effect of a given electron donor on the polymerization of a cyclic monoolefin with catalyst of a metal complex and an organometallic compound.

EXAMPLE III

Another series of runs were made employing diallylamine, 2-picoline, and 1-ethylpiperidine as promoters in the polymerization of cyclopentene. The polymerization recipe employed in these runs is shown below.

Polymerization recipe

| | |
|---|---|
| Toluene, parts by weight | 430 |
| Cyclopentene, parts by weight | 100 |
| MoCl$_3$(stearate)$_2$, millimoles | 2.56 |
| Et$_2$AlCl, millimoles | 4.5 |
| Amine promoter, millimoles | 1.0 |
| Temperature, °C. | 5 |
| Time, hours | variable |

The charge order and polymer isolation procedure employed in these runs was the same as that used in Example I. The results are shown in Table III.

TABLE III

| Run No.: | Promoter | Time, hrs. | Conv., percent | Inherent viscosity | Unsat., percent trans |
|---|---|---|---|---|---|
| 1 | None | 0.50 | 20 | | |
| 2 | do | 1.1 | 28 | | |
| 3 | do | 2.1 | 46 | | |
| 4 | do | 4.1 | 65 | 3.85 | 88 |
| 5 | Diallylamine | 0.25 | 27 | | |
| 6 | do | 0.8 | 41 | | |
| 7 | do | 2.1 | 58 | | |
| 8 | do | 4.1 | 69 | 3.63 | 87 |
| 9 | 2-picoline | 0.25 | 26 | | |
| 10 | do | 0.8 | 36 | | |
| 11 | do | 2.1 | 49 | | |
| 12 | do | 4.1 | 64 | 4.87 | 88 |
| 13 | 1-ethylpiperidine | 0.25 | 28 | | |
| 14 | do | 4.1 | 68 | 4.15 | 89 |

These runs laso show the accelerating effect of the amine promoters of this invention when employed for the polymerization of cyclopentene.

Reasonable variations and modifications are possible within the scope of this disclosure without departing from the spirit and scope thereof.

We claim:

1. A process for the polymerization of cyclic monoolefins comprising contacting said olefin, under reaction conditions, with a catalyst of (1) a metal complex having the formula MX$_n$Y$_{(z-n)}$ wherein M is niobium, molybdenum or tungsten; X is a halogen; Y is the ligand —OCOR, —OR, or —OCO—R'—OCO— wherein R is a hydrocarbon radical having from 3 to 29 carbon atoms and R' is a divalent hydrocarbon radical having from 4 to 20 carbon atoms; $n$ is an integer from 2 to 4; and $z$ is the oxidation state of M; (2) an organometallic compound having the formula R"$_a$M'X$_b$ wherein R" is a hydrocarbon radical having from 1 to 20 carbon atoms; M' is a Group I, II, or III–A metal, X is a halogen, $a$ is an integer from 1 to 3, $b$ is an integer from 9 to 3, and $a$ plubs $b$ equals the valence of M' and (3) a primary, secondary, or tertiary amine having from 1 to 30 carbon atoms, including a nitrogen-containing heterocyclic compound, wherein the molar ratio of said amine to said metal complex ranges from 0.10:1 to 0.75:1.

2. A process according to claim 1 wherein said molar ratio ranges from 0.25:1 to 0.60:1.

3. A process according to claim 1 wherein said amine is admixed with said cyclic monoolefin before said organometallic compound.

4. A process according to claim 1 wherein said cyclic monoolefin has 5 and from 7 to 15 carbon atoms per molecule.

5. A process according to claim 1 wherein said reaction conditions are a temperature in the range from —50 to 150° C., at a time in the range from 1 to 100 hours and a pressure sufficient to maintain the reaction mixure in the liquid phase.

6. A process according to claim 1 wherein the mole ratio of said organometallic compound to said metal complex is in the range from 0.1:1 to 10:1.

7. A process according to claim 1 wherein said metal complex is a molybdenum trihalo dicarboxylate.

8. A process according to claim 1 wherein said organometallic compound is an alkyl aluminum compound, an alkyl aluminum halide compound, or mixtures thereof.

9. A process according to claim 1 wherein said cyclic monoolefin is cyclopentene, said metal complex is molybdenum trichloride distearate, and said organometallic compound is diethylaluminum chloride.

10. A process according to claim 1 wherein said amine is triethylamine, N-methylmorpholine, diallylamine, isoquinoline, 2-picoline, 1-ethyl-piperidine, N,N-diallyl-sec-butylamine, o-toluidine, or di-n-butylamine.

References Cited

UNITED STATES PATENTS

| | | | |
|---|---|---|---|
| 3,336,280 | 8/1967 | Naylor | 260—94.3 |
| 3,458,489 | 7/1969 | Natta et al. | 260—93.1 |
| 3,459,725 | 8/1959 | Natta et al. | 260—93.1 |
| 3,492,278 | 1/1970 | Uraneck et al. | 260—93.1 |

JOSEPH L. SCHOFER, Primary Examiner

R. A. GAITHER, Assistant Examiner